W. F. DUNN & J. M. KERBY.
DRAFT BAR.
APPLICATION FILED JUNE 9, 1915.
1,196,533.
Patented Aug. 29, 1916.
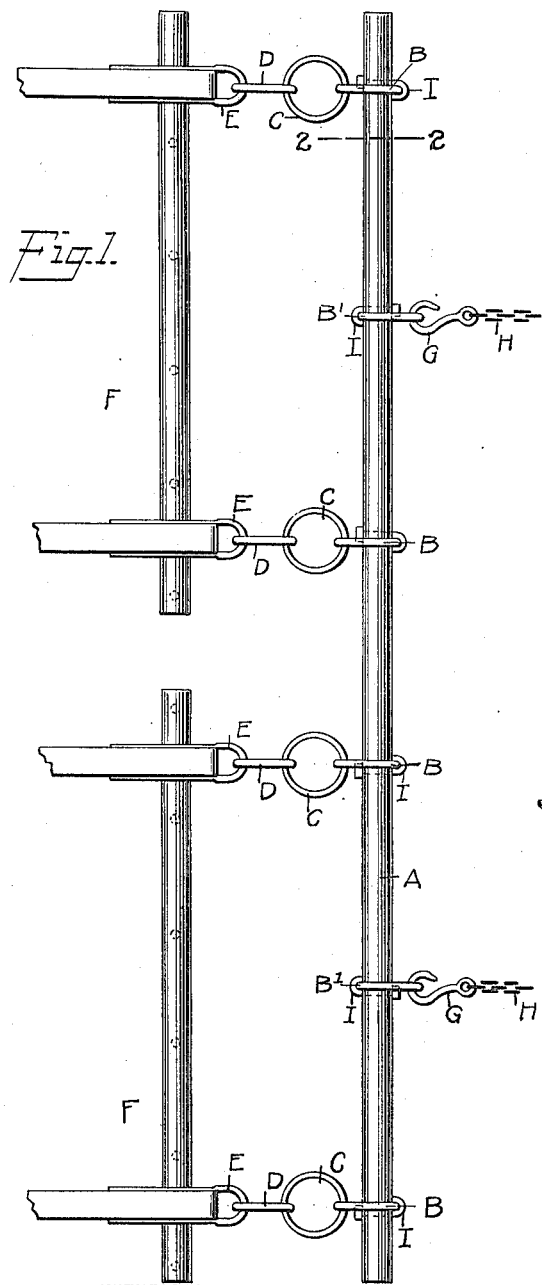
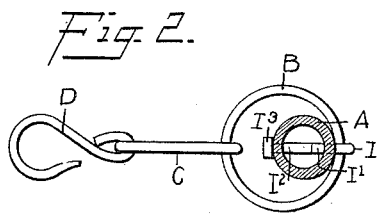
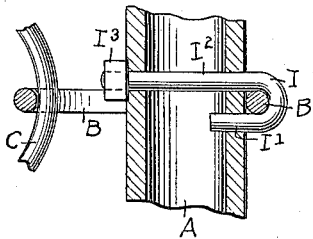
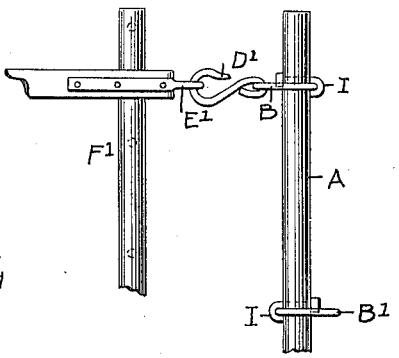
WITNESSES:
George L. Blume.
INVENTORS
W. F. Dunn.
Joe M. Kerby
ATTORNEY

UNITED STATES PATENT OFFICE.

WILLIAM F. DUNN AND JOE M. KERBY, OF TALENT, OREGON.

DRAFT-BAR.

1,196,533.	Specification of Letters Patent.	Patented Aug. 29, 1916.

Application filed June 9, 1915. Serial No. 33,068.

*To all whom it may concern:*

Be it known that we, WILLIAM F. DUNN and JOE M. KERBY, both citizens of the United States, and residents of Talent, in the county of Jackson and State of Oregon, have invented a new and Improved Draft-Bar, of which the following is a full, clear, and exact description.

The invention relates to harrows and its object is to provide a new and improved draft bar which is very simple and durable in construction, cheap to manufacture and arranged to permit of conveniently connecting the draft bar with the harrow and with the team or power employed for dragging the harrow over the field.

In order to accomplish the desired result, use is made of a tubular draft bar extending through a series of rings for connection with the harrow and pulling means employed for drawing the harrow over a field, and a staple for holding each ring in position on the draft bar, the staple having its shanks engaging the draft bar and one of the shanks extending through the draft bar and being provided at its outer end with a nut abutting against the bar.

A practical embodiment of the invention is represented in the accompanying drawings forming a part of this specification, in which similar characters of reference indicate corresponding parts in all the views.

Figure 1 is a plan view of the draft bar as applied; Fig. 2 is an enlarged sectional side elevation of the same on the line 2—2 of Fig. 1; Fig. 3 is an enlarged sectional plan view of the same; and Fig. 4 is a plan view of a modified form of the connection between the draft bar and the harrow.

A draft bar A of metal tubing extends through two sets of rings B, B', of which the rings B are connected by links C with hooks D hooking onto the eyes or goosenecks E of the sections F of the harrow, as plainly indicated in Fig. 2. The sets of rings B' are engaged by forwardly extending hooks G connected by chains H or other means with the whiffletrees or other draft devices for pulling the harrow over the field by means of a team or by power.

Each of the rings B, B' is held in position on the draft bar A by the use of a staple I engaged by the corresponding ring B or B'. Each staple I has a short shank I' and a long shank I², of which the short shank I' extends through the side wall of the bar A to the inside thereof, as plainly indicated in Figs. 2 and 3, and the other shank I² extends diametrically through both side walls of the tube A, and on the outer end of this long shank I² screws a nut I³ abutting against the corresponding side of the bar A. Thus by the arrangement described each staple I is securely held in position on the draft bar A and is prevented from turning, at the same time holding the corresponding ring B or B' in place to prevent such ring from sliding on the draft bar A but permitting them to swing laterally. By reference to Fig. 1, it will be noticed that the staples I for the rings B are located at the front side of the draft bar A, so that the said rings B extend rearwardly for connection with the harrow sections as above explained. The staples I for the rings B' are arranged on the rear side of the bar A and the rings B' extend forwardly for connection with the draft means employed for drawing the harrow over the field.

Instead of the link and hook connections C, D above described, use may be made of a single hook D' held on the corresponding ring B and hooking directly onto the eye or gooseneck E' of a harrow section F', as illustrated in Fig. 4.

The draft bar shown and described is very simple and durable in construction, and it can be readily coupled with the harrow sections or with the whiffletrees or like devices used for drawing the harrow over the ground. It will also be noticed that repairs can be quickly made, as any one of the staples I can be removed and replaced by a new one, if necessary.

Having thus described our invention we claim as new and desire to secure by Letters Patent:

1. A draft bar for harrows, comprising a ring through which extends the bar, and a staple forming an eye for the ring to pass through, the said staple having its shanks engaging the said bar and one of the shanks extending through the bar and being provided with a nut abutting against the bar.

2. A draft bar for harrows, comprising a tubular bar, a ring through which extends the bar, a staple through which passes the ring, the staple having a short shank and a long shank, the short shank extending into the bar and the long shank extending diametrically through the bar, and a nut on the outer end of the said long shank.

3. A draft bar for harrows, comprising a tubular bar, two sets of rings through which extends the said bar, two sets of staples held on the said bar, one set of staples extending forwardly and engaged by a set of rings and the other set of staples extending rearwardly and engaged by the other set of rings, each staple having one shank extending through the bar, a nut screwing on the outer end of each extended shank, rearwardly extending connections held on one set of rings and adapted to connect with the harrow, and forwardly extending connections held on the other set of rings and adapted to connect with the draft mechanism for pulling the harrow over the field.

4. A draft bar, comprising a tubular metal bar, two sets of rings of considerably greater diameter than the bar and through which the bar loosely passes, means for detachably and pivotally securing the sets of rings on the bar, one set being secured at the front and the other at the rear of the bar, whereby one set will project forwardly and the other rearwardly, and hooks carried by the rearwardly projecting rings, the forwardly projecting rings being adapted to be connected with the draft devices.

In testimony whereof we have signed our names to this specification in the presence of two subscribing witnesses.

WILLIAM F. DUNN.
JOE M. ✕ KERBY.
his   mark

Witnesses:
E. S. ADUMS,
J. O. WITHROW.

Copies of this patent may be obtained for five cents each, by addressing the "Commissioner of Patents, Washington, D. C."